(12) United States Patent
Lepage (10) Patent No.: US 8,315,845 B2
(45) Date of Patent: Nov. 20, 2012

(54) METHOD FOR BUILDING A DEPOSITIONAL SPACE CORRESPONDING TO A GEOLOGICAL DOMAIN

(75) Inventor: Francois Lepage, Montpellier (FR)

(73) Assignee: Schlumberger Technology Corporation, Sugar Land, TX (US)

(*) Notice: Subject to any disclaimer, the term of this patent is extended or adjusted under 35 U.S.C. 154(b) by 431 days.

(21) Appl. No.: 12/622,937

(22) Filed: Nov. 20, 2009

(65) Prior Publication Data

US 2011/0106507 A1 May 5, 2011

(30) Foreign Application Priority Data

Oct. 30, 2009 (EP) .................................... 09306043

(51) Int. Cl.
*G06G 7/48* (2006.01)

(52) U.S. Cl. .............................................. 703/6; 703/10

(58) Field of Classification Search .................. 703/6–10
See application file for complete search history.

(56) References Cited

U.S. PATENT DOCUMENTS

| | | | |
|---|---|---|---|
| 7,043,410 B2 * | 5/2006 | Malthe-Sorenssen et al. | ... 703/2 |
| 7,123,258 B2 | 10/2006 | Deny et al. | |
| 7,424,415 B2 * | 9/2008 | Vassilev | 703/10 |
| 7,480,205 B2 * | 1/2009 | Wei | 367/37 |
| 7,603,265 B2 * | 10/2009 | Mainguy et al. | 703/10 |
| 2002/0091502 A1 | 7/2002 | Malthe-Sorenssen et al. | |
| 2003/0216897 A1 | 11/2003 | Endres et al. | |
| 2009/0265152 A1 | 10/2009 | Cacas et al. | |

FOREIGN PATENT DOCUMENTS

| | | |
|---|---|---|
| EP | 2317348 A1 | 5/2011 |
| WO | 03/050766 A2 | 6/2003 |
| WO | 2005119304 | 12/2005 |
| WO | 2006/113939 A1 | 10/2006 |

OTHER PUBLICATIONS

Chambers et al, "Geologic Modeling, Upscaling and Simulation of Faulted Reservoirs Using Faulted Stratigraphic Grids", SPE 51889, 1999 SPE Reservoir Simulation Symposium, Feb. 1999.*
Cornu et al, "Backward Modeling of the Rifting Kinematics in the Upper Rhine Graben: Insights from an Elastic-Perfect Contact Law on the Restoration of a Multi-Bloc Domain", Int. J. Earth Sci. 94: 751-757, 2005.*
Mace et al, "Integration of Fracture Data Into 3D Geotechnical Modeling to Enhance Fractured Reservoirs Characterization", SPE 95827, 2005 SPE Annual Technical Conference and Exhibition, Oct. 2005.*
deSanti et al, "3D Geological Restoration Using a Finite Element Approach", 23rd Geocad Meeting, Nancy (France), 2003.*
Wei et al, "3D Fast Fault Restoration", SEG/New Orleans 2006 Annual Meeting, 2006.*
Mallet, J., "Space-Time Mathematical Framework for Sedimentary Geology", Mathematical Geology, Jan. 2004, pp. 1-32, vol. 36, No. 1.
GB Examination Report to UK Application No. GB1018252.5 dated Feb. 14, 2012.
Moretti, I. et al., "KINE3D: a New 3D Restoration Method Based on a Mixed Approach Linking Geometry and Geomechanics," Oil & Gas Science and Technology—Rev. IFP, 2006, pp. 277-289, vol. 61, No. 2, Institut francais du petrole.

* cited by examiner

*Primary Examiner* — Mary C Jacob (57) ABSTRACT

A method for building a depositional space corresponding to a geological domain includes the steps of (i) partitioning the present day geological domain with at least one conformal mesh sensibly matching the boundaries of said geological domain, (ii) calculating depositional coordinates defining a depositional space, wherein the depositional coordinates calculations includes calculations of fields of displacement including simulations of mechanical deformations in the geological domain, using a solid material deformation model. A computer program implementing the method is also described.

25 Claims, 5 Drawing Sheets

METHOD FOR BUILDING A DEPOSITIONAL SPACE CORRESPONDING TO A GEOLOGICAL DOMAIN

FIELD OF THE INVENTION

The general field of the invention is, not limited to, the modeling of stratified terrains in the subsurface, in oil reservoir geosciences notably. The invention pertains to a method for building a virtual and physically-reliable depositional space matching the chronostratigraphic environment at the time of deposition of geological terrains, said depositional space being then used as a computational space where many applications can be run advantageously.

Such applications include accurate modeling and interpolation of geological terrains properties such as porosity or permeability, controlling the quality of seismic reflection data interpretation, or building grids fitting the complex geometry of geological structures.

BACKGROUND OF THE INVENTION

There are potentially many applications that benefit from the use of a computational space that models the chronostratigraphic environment at the time of deposition of the terrains (which is referred to as the "depositional space"). In the following, as a review of the prior art, the specific example of the modeling of the physical properties of geological terrains is put forward in order to provide a clear understanding of the background of the invention.

The physical properties of a 3D geological domain such as porosity or permeability are usually modeled using geostatistical methods. These methods interpolate the ground properties inside a 3D high-resolution mesh on the basis of a usually sparse data, such as measurements obtained from wells. This interpolation process makes an intensive use of distances, such as Euclidean distances between the centers of mesh elements, or of correlation distances given by variograms.

The computed distributions of physical properties must reflect the paleo-environment at the time of deposition of the terrains, so the interpolation between the data obtained from the wells is accurate only if the computed Euclidean distances are close to the equivalent distances at the time of deposition (which are referred to as the "geodesic distances").

However, rocks have usually been altered since the time of deposition by erosion or faulting and folding caused by applied tectonic stresses. As a consequence, the present-day geometry of a geological domain is usually significantly different from its geometry at the time of deposition.

Thus, geostatistical methods produce inaccurate results if applied directly to the present-day space, described by the Cartesian coordinate system (x, y, z). This problem can be overcome by rather applying geostatistical methods in a "computational space" or "depositional space", which aims at matching the chronostratigraphic environment at the time of deposition. This computational or depositional space is usually fitted with a curvilinear coordinate system (u, v, w) also called "computational coordinate system" or "depositional coordinate system".

In all the following, an "isochron" refers to a surface joining points of the present-day space where sediments deposited at the same time. Seismic horizons or the top of geological layers that do not represent a gap in the geologic record are typically isochrons. Boundaries of sequences corresponding to stratigraphic unconformities are not isochrons. "Gaps" refer to situations where points of the depositional space have no corresponding location in the present-day space, and "overlaps" refer to situations where points of the depositional space have more than one corresponding location in the present-day space.

Depositional spaces, as defined in prior art documents, are expected to honor the two following properties:

Property P1: in the depositional space, the geometry of the geological domain represents a chronostratigraphic space where isochrons identified within the stratigraphic sequences are substantially planar and parallel, and where the syn- and post-depositional deformations (i.e. faulting and folding) are substantially removed;

Property P2: every point (u, v, w) of the depositional space located inside a stratigraphic sequence has one and exactly one corresponding location (x, y, z) in the present-day space. In other words, the portion of the depositional space corresponding to a stratigraphic sequence contains neither gaps nor overlaps, allowing points to be mapped from one space to another unambiguously.

So far, two main types of solutions can be found in the prior art for defining such depositional space.

A first type of solutions can be referred to as "(i, j, k) indexation" solutions, as they consist in building a 3D structured conformal mesh in the present-day space with a Cartesian coordinate system (x, y, z), which represents the present-day geometry of the geological domain. This mesh is structured, so an (i, j, k) index can be assigned to every node and element of the mesh. This indexation is such that the neighbors of a node or an element can be found by simple transformations of its index, these transformations being the same for all the nodes and elements of the mesh. Examples of such transformations are (i−1, j, k), (i, j−1, k), (i, j, k−1), (i+1, j, k), (i, j+1, k) and (i, j, k+1).

Once the (i, j, k) indexation is completed, the depositional space is very simply defined by a curvilinear coordinate system (u, v, w) such as $u(x, y, z)=i(x, y, z)$, $v(x, y, z)=j(x, y, z)$ and $w(x, y, z)=k(x, y, z)$. As the mesh is conformal, there exists a set of facets in the mesh corresponding to every horizon. As a consequence, if all the nodes of these facets have the same k index, the property "P1" is honored. In other words, the mesh must be what is often called a "stratigraphic grid".

This solution suffers from several drawbacks and limitations:

On one hand, most of the algorithms used for building such stratigraphic grids create badly-shaped (i.e. that is stretched, squeezed, concave or zero-volume) elements in the present-day (x, y, z) space, especially in the neighborhood of faults. As these elements are all right cuboids, or regular parallelepipeds, in the depositional (u, v, w) space, this means that there is a distortion when mapping points from one space to another. In other words, distances measured in the depositional space should be scaled by the distortion to match geodesic distances. This distortion can be very high locally and reduces the accuracy of the property modeling. For instance, it can dramatically alter the computed pore volume of the rocks, and thus the amount of oil and gas in these rocks.

On the other hand, there are some common configurations where it is not possible to ensure that no pair of elements have the same (i, j, k) index, so "null" or "dead" cells are artificially added in stratigraphic grids to solve these problematic configurations. As a consequence, there are gaps or overlaps in the depositional space. Both situations are unacceptable, as they break the required "P2" property.

A second type of solutions can be referred to as "parametric" solutions, as they consist in computing depositional coordinates with an interpolation of some quantities following a set of geometric rules.

An example of such a geometric solution is given in documents WO 03/050766 by Deny et al. and WO 2005/119304 by Dulac et al., both incorporated herein by reference. Three transfer functions u(x, y, z), v(x, y, z) and w(x, y, z) are interpolated at the nodes of a 3D conformal mesh representing the present-day geometry of the geological domain. The transfer function w(x, y, z) is computed first. In order to meet the requirements described above, the interpolation of the w(x, y, z) transfer function is done so that specific iso-values (iso-surfaces) of the function approximate the geometry of the horizons, which guarantees the property "P1" to be honored. Then, the two other transfer functions u(x, y, z) and v(x, y, z) are computed. The interpolation of these transfer functions is done so that their gradients are orthogonal both to each other and to the gradient of the w(x, y, z) transfer function previously computed, and so that the length of their gradients are equal. Moreover, as an additional boundary condition, the values of these two transfer functions are computed on a reference horizon, specifying that their gradients are orthogonal to each other and that the lengths of their gradients are equal. This reference horizon is chosen so that it intersects a maximum number of faults. WO 2005/119304 discloses running the interpolation on a tetrahedral mesh (a mesh whose elements are all tetrahedra).

This solution suffers from several drawbacks and limitations:

First of all, it falls in the category of geometric and kinematic approaches for modeling the deformation of the terrains through time. As mentioned in the paper "Space-time mathematical framework for sedimentary geology" by Mallet, Mathematical Geology, Vol. 36, No 1, 2004, incorporated herein by reference, computing the curvilinear coordinate system (u, v, w) using the constraints on the gradients which have been shortly described amounts to assuming that terrains have been deformed according to a "flexural slip" kinematic style, that is in which deformation is accommodated by slip along an infinite number of bedding interfaces. As a consequence, the produced depositional space is inappropriate for modeling the physical properties of the geological domain if terrains are believed to deform according to another kinematic style or any other combination of kinematic styles, such as vertical shear, inclined shear, fault-parallel flow, etc. . . . Moreover, it is uncertain which kinematic style or combination of kinematic styles should be used to model the deformation of the terrains. Indeed, kinematic methods are not based on the fundamental principles of the conservation of mass and momentum, which govern rock deformation. In addition, only strain, which is strongly dependent on the kinematic style or the combination of kinematic styles used, can be calculated with kinematic methods, and although Mallet in "Space-time mathematical framework for sedimentary geology" states it is possible to explain how fractures develop and interact, fracture mechanics tells us that the state of stress is rather required.

Secondly, to ensure that points of the depositional space have only one corresponding location in the present-day space, so as to avoid gaps and overlaps and thus breaking the required "P2" property, specific boundary conditions must be applied to the faults when using such a parametric solution: they consist in imposing some arbitrary slip directions and magnitudes for all the nodes of the facets of the mesh matching the faults. This can be considered as a severe limitation, because imposed slip directions and magnitudes are not a priori known and may not correspond to the realistic fault offsets that actually result from the mechanical deformation of rocks. As it is uncertain which slip vectors should be used as boundary conditions, such arbitrary choices can produce a significant distortion when mapping points from one space to another, and as a result the geometry of the geological domain in the depositional space may not be close to its geometry at the time of deposition. In other words, distances measured in the depositional space should be scaled by the distortion to match the geodesic distances. This distortion can be locally very high and reduces the accuracy of the property modeling. For example, it can dramatically alter the computed pore volume of the rocks, and thus the amount of oil and gas in these rocks.

The purpose of the invention is to propose a method for physically computing a curvilinear coordinate system (u, v, w) defining a depositional space.

SUMMARY OF THE INVENTION

In order to reach that objective, the invention proposes a method for building a depositional space corresponding to a geological domain, comprising the steps of:
  partitioning said geological domain with at least one conformal mesh sensibly matching the boundaries of said geological domain,
  calculating depositional coordinates defining a depositional space,
  wherein said depositional coordinates calculation comprises calculations of fields of displacement including simulations of mechanical deformations in the geological domain, using a solid material deformation model.

The depositional space as computed by the method according to the invention may advantageously be defined (without any intention to be limitative) so that it honors the two following properties (referred to as the "P1" and "P2" properties):
  Property P1: in the depositional space, the geometry of the geological domain represents a chronostratigraphic space where isochrons identified within the stratigraphic sequences are substantially planar and parallel, and where the syn- and post-depositional deformations (i.e. faulting and folding) are substantially removed;
  Property P2: every point of the depositional space located inside a stratigraphic sequence has one and exactly one corresponding location in the present-day space. In other words, the portion of the depositional space corresponding to a stratigraphic sequence contains neither gaps nor overlaps, allowing points to be mapped from one space to another unambiguously.

Advantageously,
said conformal mesh can implement element coordinates (x, y, z),
depositional coordinates (u, v, w) can be defined as $u=u(x, y, z)$, $v=v(x, y, z)$, and $w=w(x, y, z)$, and,
fields of displacement (dx, dy, dz) can be defined such as:

$$u(x,y,z)=x+dx(x,y,z),$$

$$v(x,y,z)=y+dy(x,y,z),$$

$$w(x,y,z)=z+dz(x,y,z).$$

The solid material mechanical behavior can be any behavior, such as an elastic behavior, a plastic behavior, a behavior involving the viscosity for instance, or any combination of behaviors.

The calculation of the depositional coordinates (u, v, w) can include:
- a boundary matching step, comprising an operation of associating boundaries of the geological domain each with a set of mesh facets or elements sensibly matching the geometry of said boundary, said set including at least one facet of a 3D conformal mesh, or element of a 2D conformal mesh (embedded in 3D),
- a mechanical simulation setup step, comprising a definition of boundary conditions aiming at constraining the calculated geometry of the geological domain in the depositional space (so that properties "P1" and "P2" are both honored, without any intention to be limitative),
- a mechanical simulation step, comprising a calculation in the (present-day) geological domain (x, y, z) of a field of displacements (dx, dy, dz) matching said boundary conditions.

So the invention makes possible the computation of a depositional coordinate system (u, v, w), advantageously honoring the "P1" and "P2" properties, where the geometry of the 3D geological domain is physically reliable, thereby allowing the definition of a low-distorted computational space where measured Euclidean distances are close to geodesic distances. When applied in that depositional space, geostatistical interpolations or simulation algorithms can advantageously model the physical properties of the 3D geological domain with an improved accuracy. The generation of meshes honoring the complex geometries of geological structures can also be made much easier when performed in that depositional space. As another example, the quality of a 3D seismic reflection interpretation can be more precisely checked if run in that depositional space.

In all the following, the word "horizon" is used in a very general sense, referring to a specific isochron identified within a sequence of the geological domain, without representing a gap in the geologic record. In the depositional coordinate system (u, v, w) computed by the method according to the invention, horizons may be planar and parallel ("P1" property). As a consequence, layers may not be faulted in the depositional space.

Compared to the one produced by a parametric method from prior art such as "Space-time mathematical framework for sedimentary geology" by Mallet, a fundamental difference is that in a depositional space computed with the present invention:
- no assumption is needed for the kinematic style or the combination of kinematic styles used (flexural slip, vertical shear, inclined shear, fault-parallel flow, etc),
- no assumption is needed for the slip directions and magnitudes along faults.

With the present invention, faults (or any other boundaries) are free to slip and deform, provided that mechanical contact is honored ("P2" property). This means that equilibrium of forces has been reached, without overlapping or penetration across the faults. The corresponding slip directions and magnitudes are thus an output of the computation instead of an input. The produced slip vectors result from a simulation that honors the fundamental principles of both fracture mechanics and physics that govern rock deformation. As a consequence, they provide a reliable physically-based geometry of the geological domain in the depositional space. The same remark applies to horizons: with a parametric method such as the one disclosed in document WO 2005/119304, it is not possible to model the bedding slip/detachment (or any other kind of sliding along a horizon) that might have affected some layers of the geological domain, whereas it is very easy to do so with the method according to the invention, just by setting a boundary condition that allows mechanical contact with shearing at layers interfaces.

Moreover, the present invention does not simplify the processed geological model. All the faults are taken into account, whatever the connections between them. Faults can have free borders and do not need to be artificially extended so that to be entirely connected with other boundaries of the model. The present invention is also not limited to a particular tectonic context. For example, extensional structures or compressive structures are handled exactly the same way. So the present invention can advantageously handle the full complexity of geological models.

Advantageously, in order to honor the "P1" property, the mechanical simulation setup step can further comprise the definition of a boundary condition prescribing that the nodes matching a given horizon of the geological domain have substantially the same final w(x, y, z) value,
- the final w(x, y, z) value corresponding to a given horizon can be an output of the mechanical simulation step,
- the final w(x, y, z) value corresponding to a given horizon can be explicitly specified,
- the boundary condition can further prescribe that the angle between pairs of adjacent facets or elements corresponding to the horizon is substantially equal to 180 degrees of arc.

In order to honor the "P2" property, the mechanical simulation setup step can further comprise the definition of:
- a boundary condition prescribing that the nodes matching a given side of a given fault of the geological domain are free to move provided that they stay in contact with the other side of said fault, said contact being mechanically honored,
- a boundary condition prescribing that the nodes located at the intersection between a given horizon of the geological domain and a given side of a given fault of the geological domain are free to move provided that they stay in contact with the edges corresponding to the intersection between said horizon and the other side of said fault, said contact being mechanically honored,
- a boundary condition prescribing that the nodes matching a given side of a given horizon of the geological domain are free to move provided that they stay in contact with the other side of said horizon, said contact being mechanically honored.

Advantageously,
- the displacements (dx, dy, dz) can be computed for the nodes of the mesh(es) representing the (present-day) geometry of the geological domain,
- the mechanical simulation step is not limited to the small displacement hypothesis and can handle large deformations, avoiding in that case the undesirable side effects of rotations,
- sequences identified in the geological domain can be processed separately,
- the mechanical simulation step can further comprise the use of a "master/slave" formulation to constrain the displacements (dx, dy, dz) of the nodes to stay mechanically in contact with sets of elements, facets or edges as prescribed by boundary conditions,
- the master/slave formulation can be based on a penalty method,
- the master/slave formulation can be based on the use of Lagrange multipliers.

In a first embodiment, referred to as the "FEM" embodiment, the invention further provides a method wherein the field of displacements (dx, dy, dz) is calculated using a Finite Element Method (FEM), the (present-day) geometry of the geological domain being represented by at least one 3D conformal mesh, the elements of said 3D conformal mesh being polyhedra.

Specific aspects of that embodiment are as follows:
the elements of the 3D conformal meshes can include one of the following: tetrahedra, cuboids,
the 3D conformal meshes can be hybrid, and comprise structured groups of elements and unstructured groups of elements,
the structured groups of elements can comprise cuboids and the unstructured groups of elements can comprise tetrahedra and pyramids with a quadrilateral base,
the elements of the 3D conformal meshes can be associated with parameters representing the local mechanical properties of the material contained in the portion of the geological domain enclosed in said element,
the solid material deformation model can be an elastic deformation model,
the local mechanical properties of the materials can include at least two of the following parameters: Poisson's ratio, Young's modulus, Lame parameters,
the boundary matching step can further comprise the step of retrieving the mesh elements contained in a given layer of the geological domain which contains a given element, by recursively exploring the elements adjacent to said given element, and selecting those fulfilling the condition that the facets shared by pairs of neighbor elements do not match a boundary of said layer,
the mesh elements corresponding to a given layer of the geological domain can be associated with local mechanical properties which are sensibly identical, so as to define a layer of sensibly homogeneous material,
the mechanical properties of materials associated with elements or set of elements of the 3D conformal mesh can be made to vary with time and/or iterations in the calculations,
the displacements (dx, dy, dz) can be computed by building a global stiffness matrix, as done in any classical implicit Finite Element Method known in the art,
the displacements (dx, dy, dz) can be computed iteratively by building and updating local stiffness matrices defined at the nodes of the 3D mesh representing the (present-day) geometry of the geological domain, allowing forces to be transmitted from node to node (or from a set of nodes to other sets of nodes) until equilibrium is obtained as done in any "dynamic relaxation", "multi-agent", Block Gauss-Seidel or Block Jacobi method known in the art, The method according to the "FEM" embodiment can further comprise the computation at location (x, y, z) in the geological domain of the value of a terrain property calculated (that is for instance simulated by a geostatistical method performed in the depositional space) at location (u, v, w) in the depositional space, said terrain property computation comprising the following steps:
retrieving the mesh element containing the location (x, y, z),
computing the depositional coordinates (u, v, w) of said location (x, y, z) using an analytical interpolation scheme based on the values of the depositional coordinates (u, v, w) corresponding to the nodes coordinates (x, y, z) of said container mesh element,
retrieving the value of said terrain property corresponding to coordinates (u, v, w) in the depositional space.

According to some specific aspects:
the container element can be a tetrahedron and the analytical interpolation scheme can be based on the use of barycentric coordinates,
the container element can be a cuboid and the analytical interpolation scheme can be a trilinear interpolation.

In a second embodiment, referred to as the "BEM" embodiment, the invention provides a method wherein the field of displacements (dx, dy, dz) is calculated using a Boundary Element Method (BEM), the (present-day) geometry of the geological domain being represented by a set of 2D conformal meshes embedded in 3D, each of these meshes representing a boundary of said geological domain, the elements of said 2D meshes being polygons.

Specific aspects of that embodiment are as follows:
the elements of the 2D meshes can include one of the following: triangles, quadrilaterals,
some meshes can be hybrid, and comprise structured groups of elements and unstructured groups of elements,
the structured groups of elements can comprise quadrilaterals and the unstructured groups of elements can comprise polygons,
the unstructured groups of elements can comprise triangles,
each layer of the geological domain can be associated with parameters representing the mechanical properties of the material contained in the portion of said geological domain corresponding to the inside of said layer, thus defining a homogeneous material for that layer,
the solid material deformation model can be an elastic deformation model,
the mechanical properties of the material can include at least two of the following parameters: Poisson's ratio, Young's modulus, Lamé parameters,
the mechanical properties associated with a layer can be made to vary with time and/or iterations in the calculations,
the mechanical simulation setup step can further comprise the computation of displacements (dx, dy, dz) at arbitrary locations (x, y, z) referred to as "observation points", using computed displacements (dx, dy, dz) at the location of the nodes of the 2D meshes representing the geometry of the geological domain, as described in any Boundary Element Method known in the art, The method according to the "BEM" embodiment can further comprise the computation of the value at location (x, y, z) of a terrain property calculated (that is for instance simulated by a geostatistical method performed in the depositional space) at location (u, v, w) in the depositional space, said terrain property computation comprising the following steps:
computing the depositional coordinates (u, v, w) of said location (x, y, z) used as an observation point,
retrieving the value of said terrain property corresponding to coordinates (u, v, w) in the depositional space.

It is a further object of the invention to provide a computer program implementing the method.

DESCRIPTION OF THE DRAWINGS

The methods according to embodiments of the present invention may be better understood with reference to the drawings, being understood that these drawings are given for illustrative purposes only and are not meant to be limiting.

Other aspects, goals and advantages of the invention shall be apparent from the descriptions given hereunder.

DETAILED DESCRIPTION OF THE INVENTION

Figure 1:
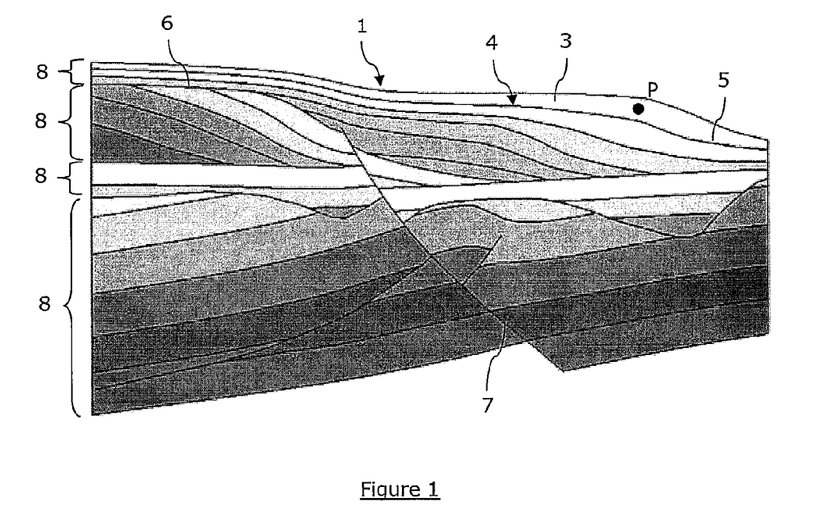
FIG. 1 shows a vertical cross-section view of a 3D geological domain composed of four sequences, with horizons, faults and unconformities.
Figure 2:
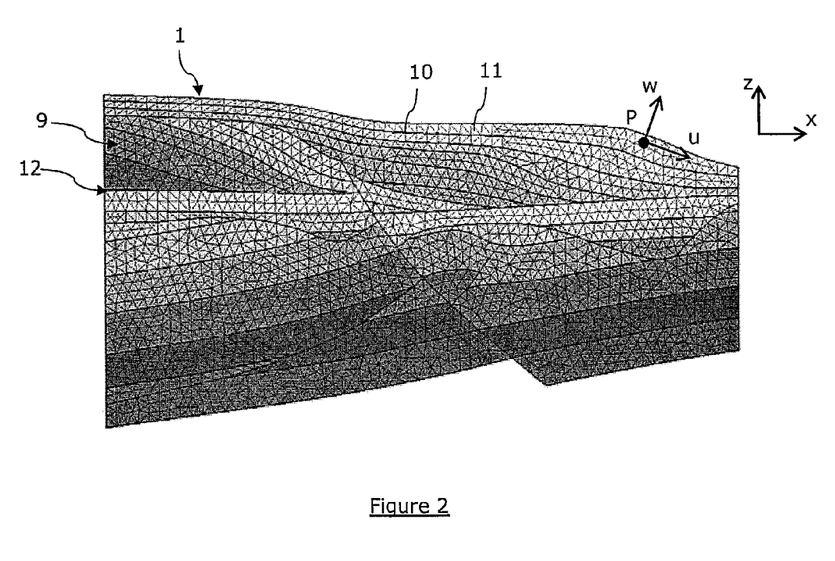
FIG. 2 shows a vertical cross-section view of an unstructured conformal mesh fitted in the geological domain of FIG. 1.

With reference to FIGS. 1 and 2, without any loss of generality and unless otherwise specified, the following definitions of terms relative to geological structure modeling apply throughout the present document:

"Meshes" 9 refer to partitions of a domain into smaller geometrical subsets called "elements" 11. So meshes 9 are discrete models of the domain they represent. Elements of three dimensional (3D) meshes are volumetric, like tetrahedra or cuboids. Elements 12 of bidimensional (2D) meshes are planar, like triangles or quadrilaterals, although they have a 3D geometry;

Each single element 11 of a mesh 9 connects a variable number of arbitrary points (at least four) of the 3D domain called "nodes" 10;

A mesh 9 is "structured" if such connections between the nodes 10 follow the same elementary pattern for all the nodes of the mesh. Otherwise, a mesh is said to be "unstructured", and in that case nodes have a variable number of connections with other nodes;

The "faces" of an element refer to the non-empty intersections of this element with any plane in the 3D space, provided that the element is entirely included in one of the two half-spaces defined by the plane. The set of such faces of dimension 0 are the nodes of the element, the set of such faces of dimension 1 are referred to as the "edges" of the element, and the set of such faces of dimension 2 are referred to as the "facets" 12 of the element (an element of a 2D mesh has no facets, only nodes and edges);

At a basin or a reservoir scale, 3D geological domains 1 are bounded by external and internal limits referred to as "boundaries" 4. A boundary is a 2D object equivalent to a surface, embedded in the 3D space;

A 3D mesh 9 representing a 3D geological domain is said to be "conformal" if there is a subset of facets 12 of the 3D mesh matching (in the most general sense) a given boundary 4, such subset of facets forming an approximation of the geometry of the boundary;

A 2D mesh 9 representing a 3D geological domain is said to be "conformal" if there is a subset of elements of the 2D mesh matching (in the most general sense) a given boundary 4, such subset of elements forming an approximation of the geometry of the boundary;

"Faults" 7 refer to boundaries of a 3D geological domain corresponding to discontinuities or breaks in the rock;

"Horizons" 5 refer to boundaries of a 3D geological domain separating younger rock from older rock without representing a gap in the geologic record;

As opposed to horizons 5, the boundaries 4 of a 3D geological domain separating younger rock from older rock and that represent a gap in the geologic record are referred to as "unconformities" 6.

"Isochrons" refer to surfaces joining points of the present-day space where sediments deposited at the same time. Horizons 5 are typically isochrons, whereas unconformities 6 are not. In all the following, "horizons" refer to specific isochrons identified within a geological domain.

The closed regions of space entirely bounded by boundaries 4 of a 3D geological domain, thus corresponding to sub-volumes of said domain, are referred to as "layers" 3;

"Sequences" 8 refer to sets of layers bounded by unconformities 6. This definition implies that the sedimentary deposits of a sequence 8 occurred continuously through time, without erosion or hiatus in deposition of sediments.

In the following description, several embodiments of the invention are described and specific examples are put forward in order to provide a thorough understanding of the invention. However, it will also be apparent to someone skilled in the art that other embodiments are possible and the invention is not limited to the examples described herein. Furthermore, features usually well known by someone skilled in the art may be omitted or simplified in order to avoid obscuring the description of the embodiments of the invention.

Figure 3:
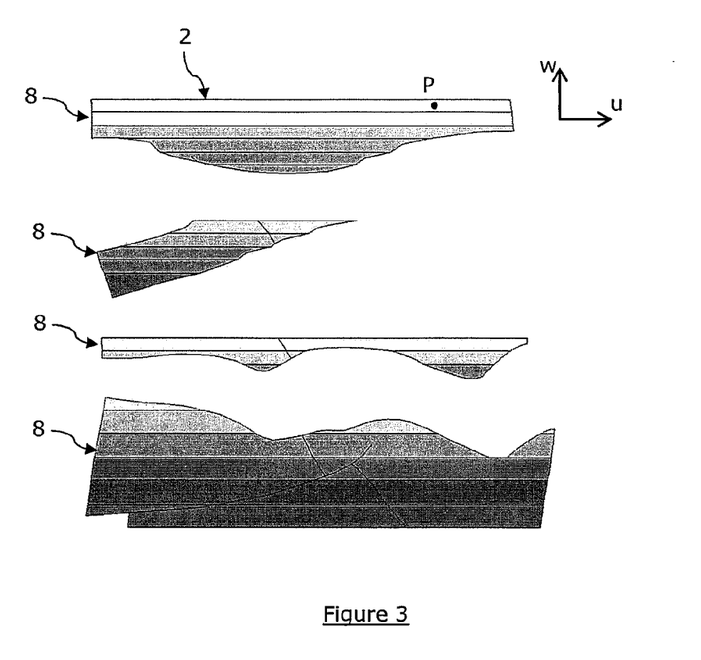
FIG. 3 shows a vertical cross-section view of the depositional spaces associated with the geological domain of FIGS. 1 and 2 (one depositional space per sequence), as calculated with a FEM method.

With reference to FIGS. 1, 2 and 3, the method according to the invention comprises the following steps:

A "boundary matching" step, for associating each relevant boundary 4 of the geological domain 1 with a unique "geological ID". That geological ID is also associated with facets 12 of a 3D conformal mesh 9 or with elements 12 of a 2D mesh which approximate the geometry of the boundary 4, thereby allowing to retrieve unambiguously either all the facets 12 of a 3D conformal mesh 9 or all the elements of a 2D mesh 12 that correspond to a given boundary 4 of the geological domain 1. This step needs to apply only to the boundaries 4 which are involved in the further steps of the method;

A "mechanical simulation setup step", for setting the boundary conditions necessary to ensure that the produced geometry of the 3D geological domain 1 in the depositional space 2 is such that both properties "P1" and "P2" are honored (without any intention to be limitative);

A "mechanical simulation step" for computing everywhere in the present-day space fitted with coordinates (x, y, z) the field of displacements (dx, dy, dz) that matches the prescribed boundary conditions, in such a way that its computation honors the principles of physics that govern rock deformation. The computed displacements allow defining a depositional coordinate system (u, v, w) such as:

$u(x,y,z)=x+dx(x,y,z)$, $v(x,y,z)=y+dy(x,y,z)$ and $w(x,y,z)=z+dz(x,y,z)$.

The present time geological domain 1 of FIGS. 1 and 2 are cross-section views at constant y, so only x and z coordinates are shown. The representation in the depositional space of FIG. 3 is a cross-section view at constant v, so only u and w coordinates are shown.

Figure 4:
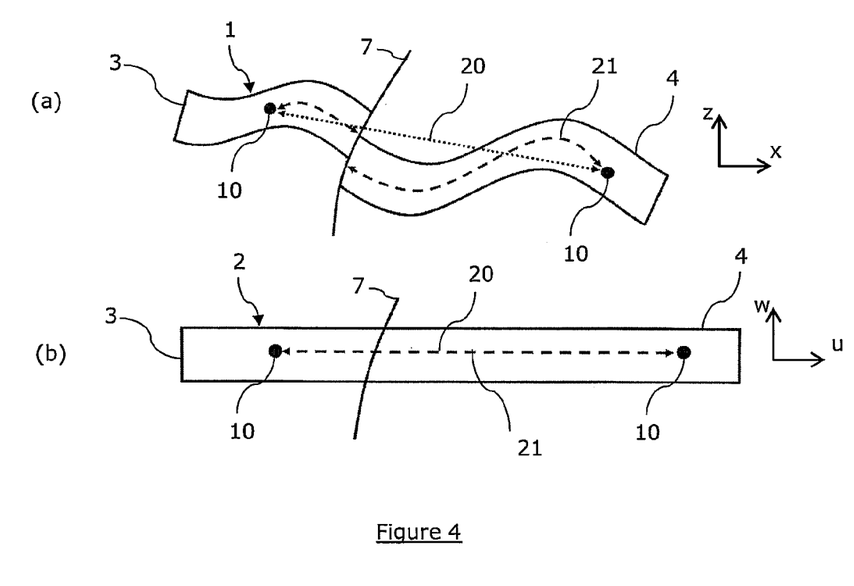
FIG. 4 illustrates the difference between Euclidean distances and geodesic distances when measured (a) in the present-day geological domain, and (b) in the depositional space.

With reference to FIG. 4, advantageously, the method of the invention allows defining a depositional space 2 fitted with a depositional coordinate system (u, v, w) honoring both properties "P1" and "P2", where the geometry of the 3D geological domain is physically reliable, thereby allowing the definition of a low-distorted computational space where measured Euclidean distances 20 are close to geodesic distances 21. When applied in that depositional space 2, geostatistical interpolations or simulation algorithms can advantageously model the physical properties of the 3D geological domain with an improved accuracy. The generation of meshes honoring the complex geometries of geological structures can also be made much easier when performed in that depositional space. As another example, the quality of a 3D seismic reflection interpretation can be more precisely checked if run in that depositional space.

There are potentially many possible implementation methods for the boundary matching step, depending on the algorithms and the data structures it uses. Usually, the more complex a data structure, the simpler the algorithm will be, although the simplicity of the algorithm is altered by the data structure update management. On the other hand, a simple data structure is efficient to update but forces the algorithm to perform explicitly a set of operations to recreate some data needed each time. As a consequence, the final choice is often a compromise.

The geological IDs associated with the boundaries of the geological domain 1, B={B1, B2, B3, ..., Bn}, where B is the restricted set of boundaries 4 involved in the further steps of the method, can be represented by a series of n arbitrary integer numbers {b1, b2, b3, ..., bn}. Although not mandatory and for the sake of clarity, B may be represented by a linear list of n records, that is a set of n records whose structural properties essentially involve only the relative position of the records. Record positions can be put into a one-to-one correspondence with the set of the first n integers, so that the geological ID bi, associated with the ith record of the list B, may be equal to i.

Figure 5:
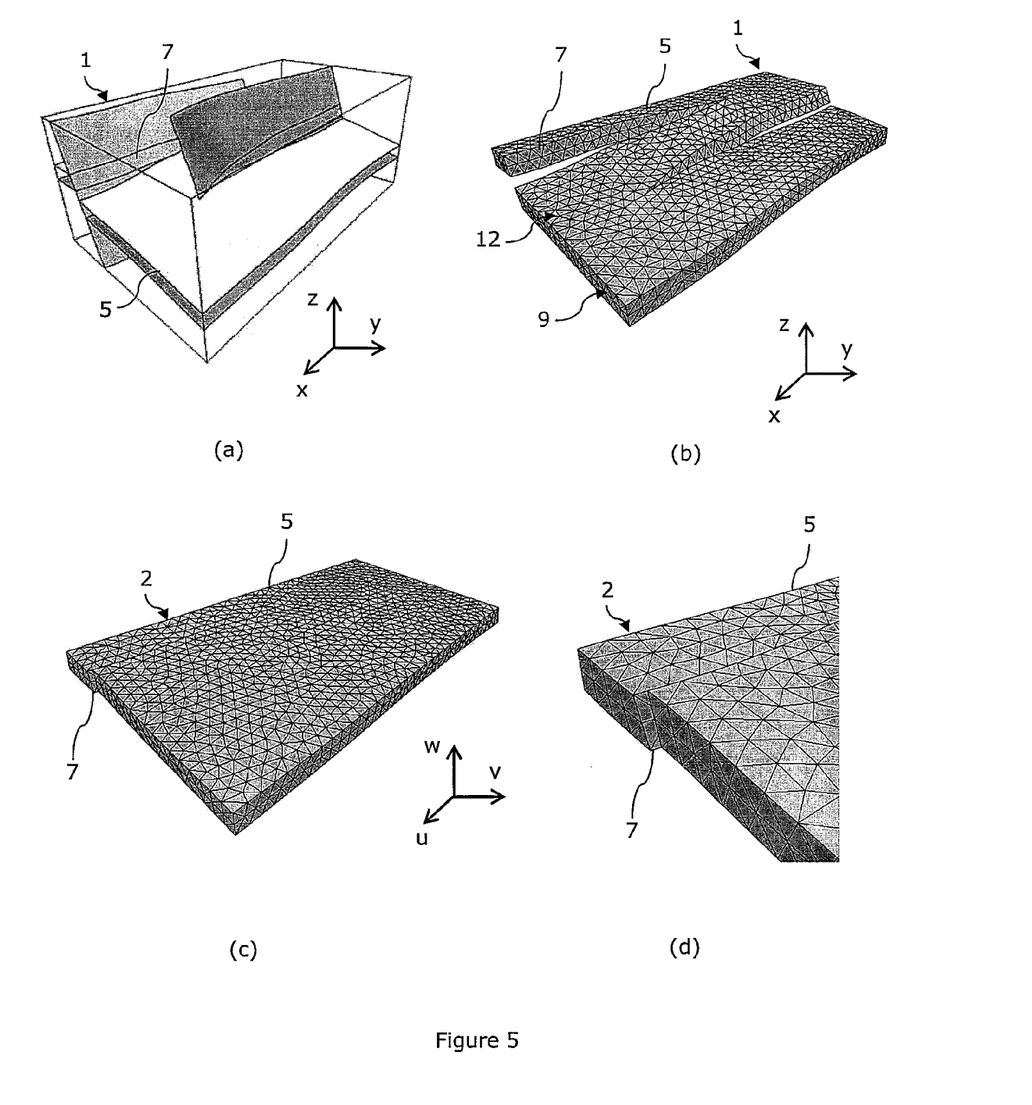
FIG. 5 illustrates a sequence of operations according to the invention: (a) in a present-day geological domain whose boundaries have been identified, (b) discretizing boundaries and/or layers with 2D or 3D conformal meshes, and (c) computing the depositional space. (d) shows a detail of the layer shown in (c) in the depositional space around a fault, where some horizontal slip can be observed as a result of the mechanical simulation.

With reference to FIG. 5, in a first embodiment, the geological domain can be represented by a 3D conformal mesh 9 whose elements 11 are all tetrahedra. The generation of the mesh is not within the scope of the invention and can be done following any classical method known in the art. Each tetrahedron has four facets 12, and each of these four facets can be simply identified with an index between 1 and 4. Facets in the tetrahedral mesh may thus be represented unambiguously by a pair (T, J) where T is a tetrahedron and J an index between 1 and 4. Let us also consider that the data structure representing a single tetrahedron t is encoded so that memory slots are reserved to store and retrieve an array of four integer values A(t)={a1, a2, a3, a4}, each aj being associated with the facet (t, j), the jth facet of t. The values of the aj may be set as follows:

if the facet (t, j) does not match a boundary of set B, then aj=−1, if the facet (t, j) matches the boundary with ith record in set B, then aj is equal to the corresponding geological ID bi (aj=i for instance).

The method assumes that the tetrahedral mesh is conformal, so there is at least one facet that matches each of the boundaries 4 contained in the set B. The values of aj may be set during an initialization step taking place at the beginning of the boundary matching step. Then, retrieving all the facets of the tetrahedral mesh that correspond to a given boundary Bi of the geological domain may involve the following steps:

first, creating an empty linear list of facets Fi, next, retrieving the geological ID bi corresponding to Bi (equal to i for example), finally, exploring all the tetrahedra of the mesh, and if for the current tetrahedron t, there is a j such that in A(t), aj=bi, inserting the facet (t, j) into Fi.

The list of facets Fi may be further split into two lists Fi+ and Fi−. The list Fi+ contains all the facets of Fi having a normal vector that locally matches (in the most general sense) the normal vector of the boundary Bi, the normal vector of a facet (T, I) being for example defined as the normal vector to the plane defined by the three nodes of the facet pointing towards the exterior of T. The list Fi− contains all the other facets of Fi. These two lists may be used to retrieve all the facets that correspond to a given side ("+" or "−") of a given boundary of the geological domain.

In that first embodiment or as soon as the present-day geometry of the geological domain 1 is represented by a 3D conformal mesh 9 whose elements 11 are general polyhedra, the unknown displacements (dx, dy, dz) can be advantageously determined using a Finite Element Method (FEM). The FEM method is a classical numerical method, well known from the one skilled in the art, so it will be only partially described here in order not to obscure embodiments of the invention. A detailed description can be for instance found in the book by Zienkiewicz and Taylor, "The Finite Element Method—Volume 1: The Basis", Butterworth-Heinemann editions (2000).

In that embodiment, referred to as the FEM method, every element 11 of the 3D conformal mesh 9 is associated with at least two parameters representing the mechanical properties of the material contained in the portion of the geological domain corresponding to the inside of that element. The number of parameters depends on the solid material deformation model implemented. An elastic deformation model requires two parameters, while plastic or more advanced deformation models require more parameters. The values of the parameters can differ from element 11 to element 11 through the mesh 9 and also change with time during the mechanical simulation step.

If the material is assumed to deform elastically during the mechanical simulation step, these parameters are usually the Poisson's ratio and the Young's modulus (or the corresponding Lame coefficients) relative to the material contained in the mesh element.

In order to honor the "P1" property, a boundary condition is set to prescribe that all the nodes 10 of the facets 12 corresponding to a given horizon 5 of the geological domain 1 have the same final w(x, y, z) value, so as to appear as a plane in the depositional space as shown in FIG. 5(c). That value can be left as an output of the mechanical simulation step, or can be explicitly specified.

In order to honor the "P2" property, another boundary condition is set to prescribe that all the nodes 10 of the facets 12 corresponding to a given side of a given fault 7 or horizon 5 of the geological domain 1 are free to move provided that they stay in contact with the facets corresponding to the other side of the fault 7 or horizon 5. Optionally, another boundary condition may be set to prescribe that all the nodes 10 located at the intersection between a given horizon 5 of the geological domain 1 and a given side of a given fault 7 of the geological domain 1 are free to move provided that they stay in contact with the edges corresponding to the intersection between the horizon 5 and the other side of the fault 7. FIG. 5(d) shows an example of how a fault 7 appears in the depositional space, with the two sides having stayed mechanically in contact without interpenetrations, but free so slide.

The computation of the unknown displacements (dx, dy, dz) at the location of each node 10 of the 3D mesh 9 representing the present-day geometry of the geological domain 1 is done with a Finite Element Method based on the boundary conditions defined in the previous mechanical simulation setup step.

Advantageously, each sequence 8 identified in the geological domain 1 can be processed separately, leading to a representation of its own depositional space 2, as shown on FIG. 3.

The FEM computation can be done by building a global stiffness matrix as done in any classical implicit Finite Element Method known in the art.

Alternatively, The FEM computation can be done iteratively by building and updating local stiffness matrices defined at the nodes 10 of the 3D mesh 9 representing the present-day geometry of the geological domain 1, allowing forces to be transmitted from node to node (or from a set of nodes to other sets of nodes) until equilibrium is obtained as done in any "dynamic relaxation", "multi-agent", Block Gauss-Seidel or Block Jacobi method known in the art. Such methods are described for instance in the book by Saad, "Iterative Methods for Sparse Linear Systems", Siam editions (2003).

The FEM computation is not limited to the small displacement hypothesis and can handle large deformations, avoiding in that case the undesirable side effects of rotations.

In order to constrain the nodes 10 to stay mechanically in contact with sets of facets 12 or edges, as it might be prescribed by some boundary conditions defined in the mechanical simulation setup step, a "master/slave" formulation is used. That formulation can be for instance based on a classical penalty method or on the use of Lagrange multipliers.

In the following, an example of application of the Finite Element Method to the computation of mechanical deformation of solid materials is given, based on an elastic deformation model. Only a brief overview is given, as the FEM method itself is common knowledge.

Under the small displacement hypothesis, the Green-Lagrange deformation tensor $\epsilon$ is defined by:

$$\varepsilon_{IJ}(d) = \frac{1}{2}(d_{I,J} + d_{J,I})$$

where $d_{I,J}$ denotes the $J^{th}$ partial derivative of the $I^{th}$ component of the unknown displacement d=(dx, dy, dz). For isotropic elastic solids, the stress tensor $\sigma$ is given by the Hooke's law:

$$\begin{bmatrix} \sigma_{xx} \\ \sigma_{yy} \\ \sigma_{zz} \\ \sigma_{xy} \\ \sigma_{xz} \\ \sigma_{yz} \end{bmatrix} = \begin{bmatrix} \lambda+2\mu & \lambda & \lambda & 0 & 0 & 0 \\ \lambda & \lambda+2\mu & \lambda & 0 & 0 & 0 \\ \lambda & \lambda & \lambda+2\mu & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{bmatrix} \begin{bmatrix} \varepsilon_{xx} \\ \varepsilon_{yy} \\ \varepsilon_{zz} \\ 2\varepsilon_{xy} \\ 2\varepsilon_{xz} \\ 2\varepsilon_{yz} \end{bmatrix}$$

where the Lamé coefficients $\lambda$ and $\mu$ are defined from the Young's modulus E and Poisson's ratio v:

$$\lambda = \frac{vE}{(1+v)(1-2v)}$$

$$\mu = \frac{E}{2(1+v)}$$

The momentum conservation equation in the quasi-static case gives:

$$\text{div } \sigma(d)=0$$

with usual displacement and boundary conditions. In particular, when nodes 10 are required to stay mechanically in contact with sets of facets 12 or edges, a non-penetration constraint is set, prescribing that the distance of the projection of such nodes on such sets of facets or edges to the local normal plane to the nodes is null ("master/slave" formulation).

According to the Finite Element Method, the unknown displacement field d is searched in the kinematic admissible displacement field D. We also define the space V of "test" admissible virtual displacement field v. The virtual work principle gives the momentum conservation law as an integral form:

$$\text{Find } d \in D, \forall v \in V, \int_{\Omega_s} [div\sigma(d)] \cdot v \, dV = 0$$

where $\Omega_s$ is the considered solid defined by its spatial coordinates. The latter equation can be considered as a minimization problem of a functional. Then, in order to take into account the non-penetration constraints, the minimization problem is rewritten, replacing the functional by a Lagrangian function L(d, $\lambda$), where $\lambda$ is an unknown Lagrange multiplier. Let h be the mesh used for the discretization of the considered solid. The Finite Element Method approximates the unknowns $d_h$ and $\lambda_h$ on finite dimensional spaces, and a non-linear vectorial system $R(d_h, \lambda_h)$ may be obtained by enforcing:

$$\begin{pmatrix} \left( \frac{\partial L(d_h, \lambda_h)}{\partial d}, v \right) \\ \left( \frac{\partial L(d, \lambda_h)}{\partial \lambda}, \mu \right) \end{pmatrix} = 0 \forall (v, \mu) \in \{g_1, \ldots, g_n\} \times \{\Lambda_1, \ldots, \Lambda_m\}$$

where $\{g_1, \ldots, g_n\}$ and $\{\Lambda_1, \ldots, \Lambda_n\}$ are the basis of given shape functions approximating displacements and Lagrange multipliers respectively. The resulting non-linear system can be solved iteratively in order to nullify the first order residual at step (n+1) according that $R(d_h, \lambda_h)$ is not null at step n. Defining:

$$\begin{pmatrix} \Delta d_h^{n+1} \\ \Delta \lambda_h^{n+1} \end{pmatrix} = \begin{pmatrix} d_h^{n+1} - d_h^n \\ \lambda_h^{n+1} - \lambda_h^n \end{pmatrix}$$

it follows that:

$$\left( \frac{\partial R(d_h^n, \lambda_h^n)}{\partial(d, \lambda)} \right) \begin{pmatrix} \Delta d_h^{n+1} \\ \Delta \lambda_h^{n+1} \end{pmatrix} = -R(d_h^n, \lambda_h^n)$$

where $$\frac{\partial R(d_h^n, \lambda_h^n)}{\partial(d, \lambda)} = \begin{pmatrix} M^n & B^{nT} \\ B^n & 0 \end{pmatrix}$$

is the tangent matrix of the residual R. This matrix system can be directly inversed in two dimensions with a LU factorization, or solved iteratively in three dimensions with an Uzawa or Minimal Residual Fashion algorithm (see for example Saad, "Iterative Methods for Sparse Linear Systems", Siam editions (2003)).

Finally, the solved nodal displacements (dx, dy, dz) are used to define the depositional coordinate system (u, v, w) at the location of each node 10 used in the 3D conformal mesh 9. Referring to FIGS. 2 and 3, a point P with Cartesian coordinates (x, y, z) in the present-day geological domain 1 is attributed (u, v, w) coordinates in the depositional space 2.

The computation of the value at any present-day location (x, y, z) of a property 30 simulated by any geostatistical method performed in the computed depositional coordinate system (u, v, w) can be then done with the following operations:

retrieving of the mesh element containing the given present-day location (x, y, z), assuming that the depositional coordinates (u, v, w) within each mesh element 11 are fully defined by their values at the nodes of said element, computing of the depositional coordinates (u, v, w) of given present-day location (x, y, z) using an analytical interpolation scheme based on the values of the depositional coordinates at the nodes 10 of the container element, retrieving the element of the 3D high-resolution mesh 35 of the depositional space on which the geostatistical method has been applied, which contains the computed location (u, v, w), retrieving the value of the simulated property attached to said element.

In a second embodiment, the geological domain 1 can be represented by a set M of 2D independent meshes (for example made of triangles 12), each of these meshes representing a boundary 4 of the set B. The generation of the 2D meshes is not within the scope of the invention and can be done following any classical method known in the art. M can be represented for instance by a linear list M={M1, M2, M3, . . . , Mn}. The data structure representing such a triangular mesh Mj is encoded so that memory slots are reserved to store and retrieve an integer value A(Mj). The value of A(Mj) is set so that if the mesh Mj represents the boundary Bi, then A(Mj) is equal to the corresponding geological ID bi (equal to i for example). The value of the A(Mj) may be set during an initialization step taking place at the beginning of the boundary matching step. Then, retrieving all the triangles that correspond to a given boundary Bi of the geological domain may involve the following steps:

first, creating an empty linear list of elements Ti, next, retrieving the geological ID bi corresponding to Bi (equal to i for example), finally, exploring all the meshes of set M, and if for the current mesh with index j, A(Mj)=bi, inserting all the elements of Mj into Ti.

In that second embodiment, the unknown displacements (dx, dy, dz) are advantageously determined using a Boundary Element Method (BEM). The BEM method is a classical numerical method, well known from the one skilled in the art, so it will be only partially described here in order not to obscure embodiments of the invention. A detailed description can be for instance found in the book by Aliabadi, "The Boundary Element Method: Applications in Solids and Structures—Vol. 2", Wiley editions (2002).

In the context of geomechanics, a Boundary Element representation applies when the partial differential equations (PDEs) governing the deformation of rocks are piecewise homogeneous, and for which a Green's function can be found or approximated. In such cases, the unknown displacement of the system can be reduced to the self-contained displacement of the interfaces separating layers 3 with homogeneous mechanical properties. The Boundary Element Method uses the given boundary conditions to fit boundary values into the integral equation.

The BEM method assumes that the present-day geometry of the geological domain is represented by a set of 2D meshes, each of these meshes representing a boundary 4 of said geological domain (see FIG. 5), and that the elements 12 of said 2D meshes are general polygons. As the functions used for approximating the solution inside the geological domain are chosen to be only those which satisfy the governing equations exactly, no volumetric (3D) elements are needed.

Each individual polygon 12 forming the 2D meshes can be associated with mixed traction-displacement boundary conditions, and when such boundary conditions are specified, the method solves the corresponding unknown displacements. The polygons can advantageously be triangles, but common Boundary Element Methods naturally handle other types of polygons.

In that embodiment, referred to as the BEM embodiment, every layer of the geological domain is associated with at least two parameters representing the mechanical properties of the material contained in the portion of the geological domain corresponding to the inside of that layer, thus defining a homogeneous material for that layer. The number of parameters depends on the solid material deformation model implemented. An elastic deformation model requires two parameters, while plastic or more advanced deformation models require more parameters. The values of the parameters can change with time during the mechanical simulation step.

If the material is assumed to deform elastically during the mechanical simulation step, these parameters are usually the Poisson's ratio and the Young's modulus (or the corresponding Lame coefficients) relative to the material contained in the layer.

In order to honor the "P1" property, a boundary condition is set to prescribe that all the nodes 10 of the elements 12 corresponding to a given horizon 5 of the geological domain 1 have the same final w(x, y, z) value, so as to appear as a plane in the depositional space as shown in FIG. 5(c). That value can be left as an output of the mechanical simulation step, or can be explicitly specified.

In order to honor the "P2" property, another boundary condition is set to prescribe that all the nodes 10 of the elements 12 corresponding to a given side of a given fault 7 or horizon 5 of the geological domain 1 are free to move provided that they stay in contact with the elements corresponding to the other side of that fault 7 or horizon 5. Optionally, another boundary condition can be set to prescribe that all the nodes 10 located at the intersection between a given horizon 5 of the geological domain 1 and a given side of a given fault 7 of the geological domain 1 are free to move provided that they stay in contact with the edges corresponding to the intersection between said horizon 5 and the other side of said fault 7. FIG. 5(d) shows an example of how a fault 7 appears in the depositional space, with the two sides having stayed in contact without interpenetrations, but free so slide.

The computation of the unknown displacements (dx, dy, dz) at the location of each node 10 of the 2D meshes representing the present-day geometry of the geological domain 1 is done with a Boundary Element Method based on the boundary conditions defined in the previous mechanical simulation setup step. Each sequence 8 identified in the geological domain 1 can be processed separately. The BEM computation is not limited to the small displacement hypothesis and can handle large deformations, avoiding in that case the undesirable side effects of rotations.

Optionally, other unknown displacements (dx, dy, dz) can be computed at arbitrary present-day locations (x, y, z) referred to as "observation points", using the computed displacements at the location of each node 10 of the 2D meshes representing the present-day geometry of the geological domain 1, as described in any Boundary Element Method known in the art.

In the following, an example of application of the Boundary Element Method to the computation of mechanical deformation of solid materials is given, based on an elastic deformation model. Only a brief overview is given, as the BEM method itself is of common knowledge.

This method assumes that the constitutive and equilibrium equations defining the mechanical problem involve two operators or matrices T(p, q) and U(p, q), where T(p, q) is the traction operator giving the tractions t at "field" point q due to a unit load at "source" point p, and U(p, q) is a Green's function giving the displacement d at "field" point q due to a unit load at "source" point p. For example, these two operators can be given by the fundamental solutions of linear elasticity. The Betti theorem gives the unknown displacement d at point p:

$$d(p) = \int_S t(q)^t \cdot U(p,q)\, ds - \int_S d(q)^t \cdot T(p,q)\, ds$$

where S is the boundary of the considered solid. Using a discretization of S into polygonal elements, we obtain the system of equations:

$$M_T \cdot d = M_U \cdot t$$

with t the set of prescribed tractions, and $M_T$ and $M_U$ two dense and non-symmetric matrices. Therefore, the amount of computer memory needed to store the system of equations is in the order of $n^2$ and the complexity of an iterative solver is in the order of $k \cdot n^2$, with n being the number of unknowns and k the number of iterations needed to solve the system. However, specific techniques such as multipole expansion (as described for instance in Geengard and Rokhlin, "A Fast Algorithm for Particle Simulations", J. Comput. Phys., Vol. 73, 1987) or hierarchical matrices (as described for instance in Hackbusch, "A Sparse Matrix Arithmetic Based on H-Matrices—Part I—Introduction to H-Matrices", Computing, Vol. 86, No 4, 1999) can be used to reduce the complexity in the order of $n \cdot \log(n)$.

Finally, the solved nodal displacements (dx, dy, dz) are used to define the depositional coordinate system (u, v, w) at the location of each node 10 of the 2D meshes representing the present-day geometry of the geological domain 1 and/or at any observation point.

Figure 6:
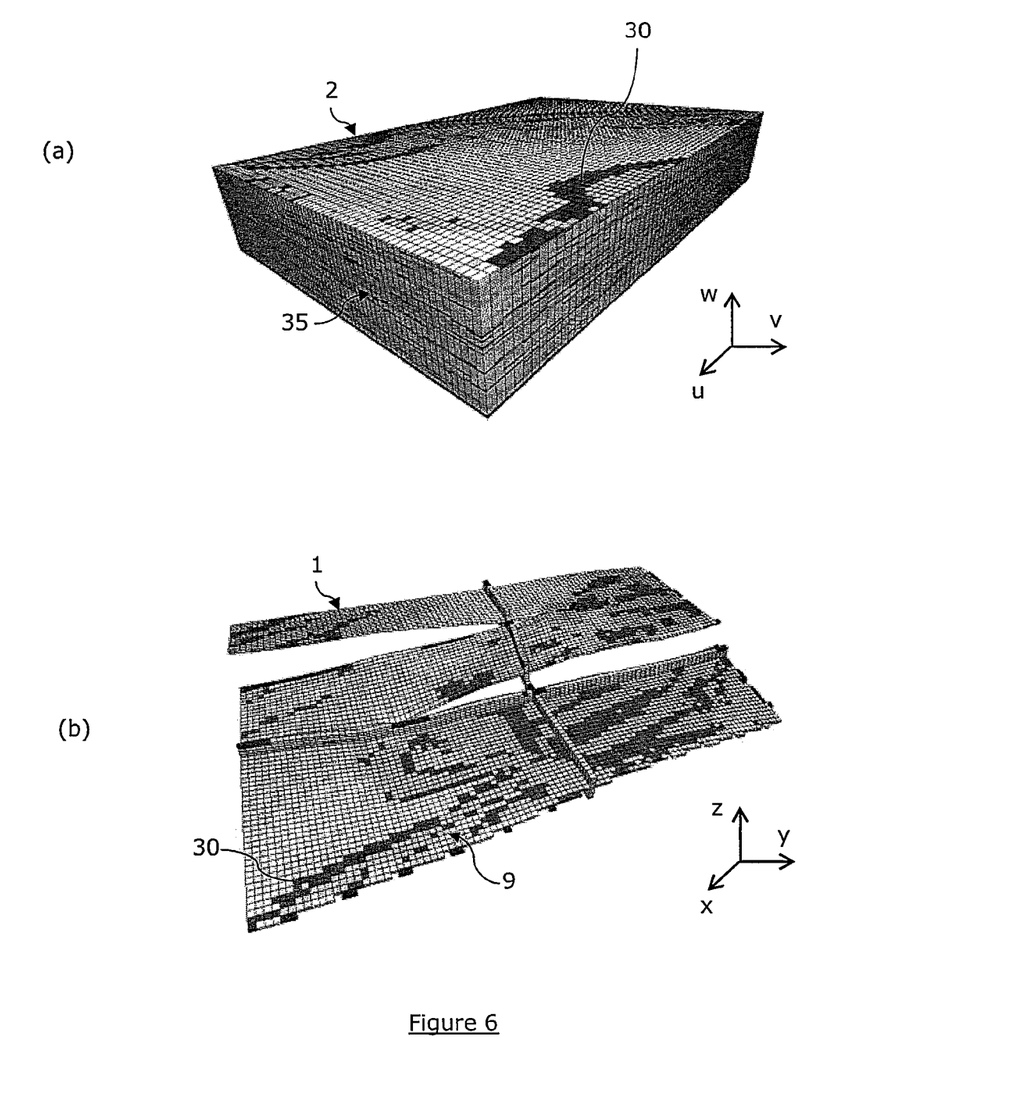
FIG. 6 illustrates a post-processing method, showing in (a) the 3D high-resolution mesh populated in the depositional space with material properties simulated in that space, and in (b) an inner view of another mesh representing a layer of the present-day geological domain populated with the properties simulated in the mesh shown in (a).
Figure 7:
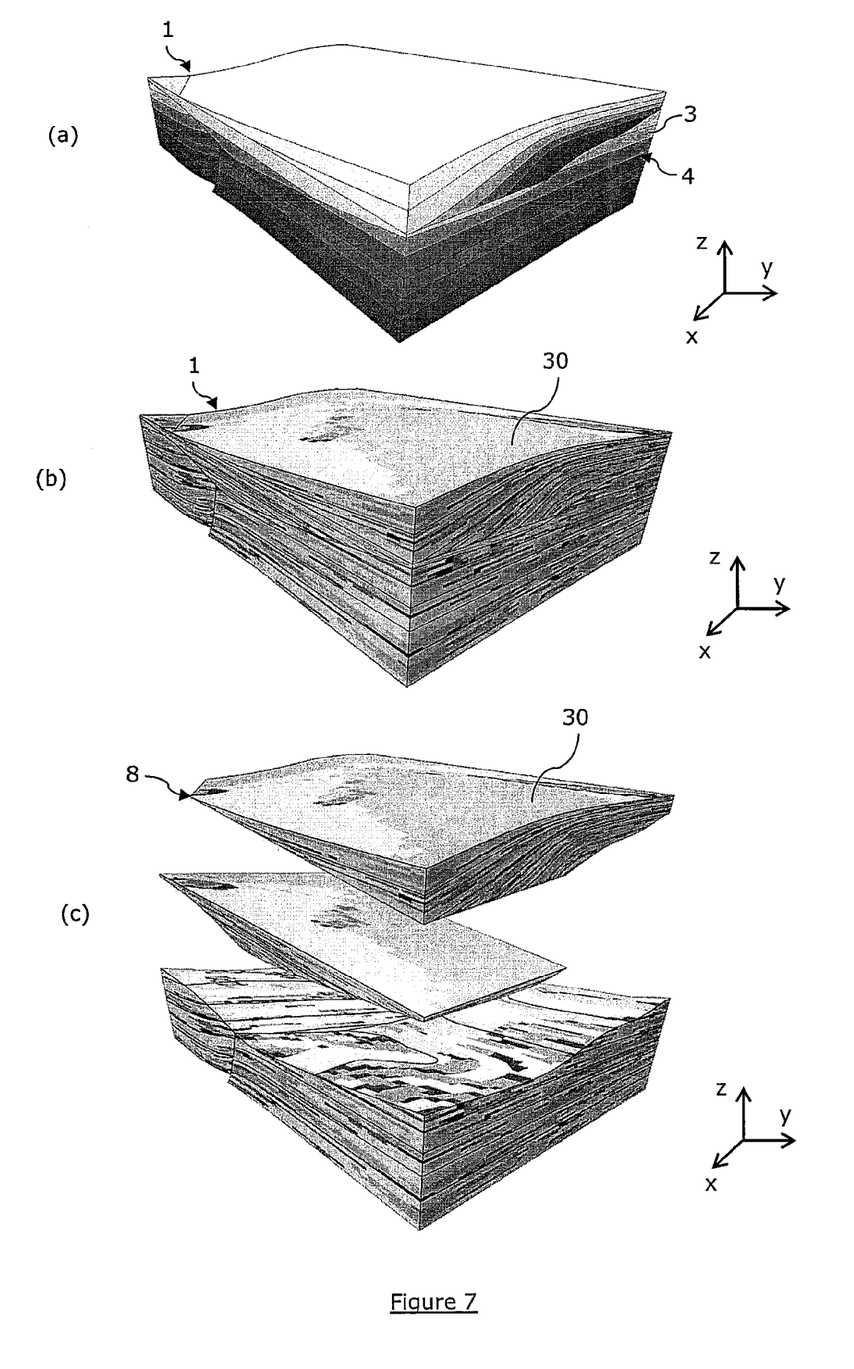
FIG. 7 illustrates a post-processing method for building a 3D hybrid grid (mostly structured) representing the present-day geometry of the geological domain, populated with properties simulated in the depositional space produced by the method according to the invention: are shown in (a) the 3D geological domain with the layers and boundaries identified, in (b) the same geological domain meshed with the created grid, populated with properties simulated in the depositional space, and in (c) a separated view of the sequences of the geological domain shown in (b).

With reference to FIGS. 6 and 7, The computation of the value at any present-day location (x, y, z) of a property 30 simulated by any geostatistical method performed in the computed depositional coordinate system (u, v, w) can be done with the following operations:

computing the depositional coordinates (u, v, w) of a given present-day location (x, y, z), which has been previously computed as an observation point, retrieving the element of the 3D high-resolution mesh 35 of the depositional space on which the geostatistical method has been applied, which contains the computed location (u, v, w), retrieving the value of the simulated property attached to that element.

More generally, the invention includes also a post-processing method for "painting" the elements of a 3D mesh 9 representing the present-day geometry of a geological domain 1 with properties 30 simulated in the depositional space which has been produced by the method according to the invention. It comprises the following steps:

for each element e of a 3D mesh 9 partitioning the volume of the present-day geological domain, computing the present-day location b of its barycenter, computing the depositional coordinates b' corresponding to the present-day location b as previously described, using a "FEM" or a "BEM" method, retrieving the element c of a (usually) high resolution 3D mesh 35 partitioning the volume of the depositional space 2 to which the geostatistical method has been applied and which contains the computed location b', retrieving the value of the simulated property 30 attached to said element c, finally, associating that value with the element e.

Illustrations of this process can be found on FIGS. 6 and 7. In FIG. 6(b), a 3D mesh 9 (which may be the one already used for the calculation of the depositional space 2) is populated with the properties 30 computed in the depositional space 2 fitted with a high-density mesh 35 as shown on FIG. 6(a). In FIG. 7(b), properties 30 computed in the depositional space 2 are integrated in the geological domain following a new 3D mesh, mostly structured, which fits better for the application. In FIG. 7(c) sequences are displayed separately for a better comprehension.

Any method embodiment (or portion thereof) described herein may be implemented in terms of program instructions. The program instructions may be stored on any of various kinds of readable computer memory media. The program instructions may by readable and executable by any computer or set of computers to implement the method embodiment (or portion thereof).

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention, the essential point being to use the theory of mechanics and rock deformation to build a depositional space, advantageously, (i) where isochrons (horizons) identified within a 3D geological domain are substantially planar and parallel, (ii) such that every point of the depositional space located inside a stratigraphic sequence has one and exactly one corresponding location in the present-day space, and (iii) where the geometry of the 3D geological domain is physically reliable, said depositional space being thus used as a computational space for applications like accurate modeling and interpolation of the physical properties of the subsurface, mesh generation for complex geometries of geological structures, or quality checking of a 3D seismic reflection interpretation.

The invention claimed is:

1. A method for building a depositional space corresponding to a geological domain of a stratified terrain that comprises horizons, the method comprising:
    partitioning said geological domain with at least one conformal mesh comprising element coordinates, said at least one conformal mesh matching boundaries of said geological domain, wherein the boundaries comprise the horizons,
    calculating depositional coordinates defining a depositional space to represent the horizons as substantially planar and parallel,
    wherein said depositional coordinates calculation comprises computer calculations of fields of displacement along the element coordinates with specified boundary conditions for the horizons using a solid material deformation model for simulating mechanical deformations in the geological domain,
    wherein said depositional coordinates calculation provides for attribution of point coordinates in the geological domain to point coordinates in the depositional space, allowing points to be mapped therebetween, and
    wherein said depositional space provides for computing physical properties of the stratified terrain based on measured data for the stratified terrain.

2. A method according to claim 1, with (i) said at least one conformal mesh implementing the element coordinates as (x, y, z), (ii) the depositional coordinates as (u, v, w) being defined as u=u(x, y, z), v=v(x, y, z), w=w(x, y, z), and (iii) the fields of displacement as (dx, dy, dz) being defined as:

$$u(x,y,z)=x+dx(x,y,z),$$

$$v(x,y,z)=y+dy(x,y,z),$$

$$w(x,y,z)=z+dz(x,y,z),$$

wherein the calculation of the depositional coordinates (u, v, w) comprises:
    boundary matching, comprising an operation of associating the boundaries of the geological domain each with a matching set of mesh facets or elements, said set including at least one facet of a 3D conformal mesh or element of a 2D conformal mesh,
    mechanical simulation setting up, comprising a definition of the specified boundary conditions aiming at constraining the calculated geometry of the geological domain in the depositional space,
    mechanical simulation, comprising a calculation in the geological domain (x, y, z) of a field of displacements (dx, dy, dz) matching said specified boundary conditions.

3. A method according to claim 2, wherein the mechanical simulation setting up further comprises the definition of a boundary condition prescribing that nodes of a facet or element matching a given one of the horizons of the geological domain have substantially the same final w(x, y, z) value.

4. A method according to claim 3, wherein the final w(x, y, z) value corresponding to a given one of the horizons comprises a member selected from a group consisting of:
    an output of the mechanical simulation step, and
    a value which is explicitly specified.

5. A method according to claim 3, wherein the boundary condition prescribes further that an angle between pairs of adjacent facets or elements corresponding to a given one of the horizons is substantially equal to 180 degrees of arc.

6. A method according to claim 3, wherein the mechanical simulation setting up further comprises the definition of a boundary condition prescribing that the nodes matching a given side of a given fault of the geological domain are free to move provided that the nodes stay in contact with the other side of said fault.

7. A method according to claim 6, wherein the mechanical simulation setting up further comprises the definition of a boundary condition prescribing that the nodes located at the intersection between a given one of the horizons of the geological domain and a given side of a given fault of the geological domain are free to move provided that the nodes stay in contact with edges corresponding to an intersection between said horizon and the other side of said fault.

8. A method according to claim 3, wherein the mechanical simulation setting up further comprises the definition of a boundary condition prescribing that the nodes matching a given side of a given one of the horizons of the geological domain are free to move provided that the nodes stay in contact with the other side of said horizon.

9. A method according to claim 3, wherein the displacements (dx, dy, dz) are computed for the nodes of the mesh(es) representing the geometry of the geological domain.

10. A method according to claim 3, wherein sequences identified in the geological domain are processed separately.

11. A method according to claim 3, wherein the mechanical simulation further comprises use of a "master/slave" formulation to constrain the displacements (dx, dy, dz) of the nodes to stay mechanically in contact with sets of elements, facets or edges as prescribed by the boundary conditions.

12. A method according to claim 11, wherein the master/slave formulation is based on a penalty method.

13. A method according to claim 11, wherein the master/slave formulation is based on the use of Lagrange multipliers.

14. A method according to claim 2, wherein the field of displacements (dx, dy, dz) is calculated using a Finite Element Method (FEM), the geometry of the geological domain being represented by at least one 3D conformal mesh.

15. A FEM method according to claim 14, wherein the at least one 3D conformal mesh is hybrid, and comprises a structured group of elements and an unstructured group of elements.

16. A FEM method according to claim 14, wherein elements of the at least one 3D conformal meshes are associated with parameters representing the local mechanical properties of the material contained in the portion of the geological domain enclosed in each of said elements.

17. A FEM method according to claim 16, wherein the solid material deformation model is an elastic deformation model.

18. A FEM method according to claim 14, wherein the displacements (dx, dy, dz) are computed using a technique selected from a group consisting of:
    building a global stiffness matrix, and iteratively building and updating local stiffness matrices defined at the nodes of the 3D mesh representing the geometry of the geological domain.

19. A FEM method according to claim 14, further comprising the computation at location (x, y, z) in the geological domain of the value of a terrain property for the stratified terrain calculated at location (u, v, w) in the depositional space, said terrain property computation comprising the following steps:
retrieving the mesh element containing the location (x, y, z),
computing the depositional coordinates (u, v, w) of said location (x, y, z) using an analytical interpolation scheme based on the values of the depositional coordinates (u, v, w) corresponding to the nodes coordinates (x, y, z) of said container mesh element,
retrieving the value of said terrain property corresponding to coordinates (u, v, w) in the depositional space.

20. A method according to claim 2, wherein the field of displacements (dx, dy, dz) is calculated using a Boundary Element Method (BEM), the geometry of the geological domain being represented by a set of 2D conformal meshes, each of these meshes representing a boundary of said boundaries of said geological domain.

21. A BEM method according to claim 20, wherein the 2D conformal meshes are hybrid, and comprise structured groups of elements and unstructured groups of elements.

22. A BEM method according to claim 20, wherein the solid material deformation model is an elastic deformation model.

23. A BEM method according to claim 20, wherein the mechanical simulation setup step further comprises the computation of displacements (dx, dy, dz) at arbitrary locations (x, y, z) referred to as "observation points", using computed displacements (dx, dy, dz) at the location of nodes of the 2D meshes representing the geometry of the geological domain.

24. A BEM method according to claim 20, further comprising the computation at location (x, y, z) in the geological domain of the value of a terrain property of the stratified terrain calculated at location (u, v, w) in the depositional space, said terrain property computation comprising:
computing the depositional coordinates (u, v, w) of said location (x, y, z) used as an observation point, and
retrieving the value of said terrain property corresponding to coordinates (u, v, w) in the depositional space.

25. A computer-readable non-transitory storage medium comprising computer-executable instructions to instruct a computer to:
build a depositional space corresponding to a geological domain of a stratified terrain that comprises horizons by partitioning said geological domain with at least one conformal mesh comprising element coordinates, said at least one conformal mesh matching boundaries of said geological domain, wherein the boundaries comprise the horizons
calculating depositional coordinates defining a depositional space to represent the horizons as substantially planar and parallel,
wherein said depositional coordinates calculation comprises calculations of fields of displacement along the element coordinates with specified boundary conditions for the horizons using a solid material deformation model for simulating mechanical deformations in the geological domain,
wherein said depositional coordinates calculation provides for attribution of point coordinates in the geological domain to point coordinates in the depositional space, allowing points to be mapped therebetween, and
wherein said depositional space provides for computing physical properties of the stratified terrain based on measured data for the stratified terrain.

* * * * *